SELF-THREADING TAPE REEL

Filed Oct. 10, 1966

INVENTOR
ROBERT J. RAMIG JR.

BY R.C. Terry
ATTORNEY

United States Patent Office 3,414,206

Patented Dec. 3, 1968

3,414,206

SELF-THREADING TAPE REEL

Robert J. Ramig, Jr., Niles, Ill., assignor to Teletype Corporation, Skokie, Ill., a corporation of Delaware Filed Oct. 10, 1966, Ser. No. 585,680
16 Claims. (Cl. 242—55.11)

ABSTRACT OF THE DISCLOSURE

A tape winding mechanism including a rotatably supported tape reel having a plurality of triangularly shaped toothed projections extending inwardly from one of its flanges and a pair of individually spring loaded fingers for urging a tape to be wound into engagement with the projections initially angularly so that at least one of the projections engages the tape to start the winding thereof and subsequently cylindrically so that the tape disengages itself from the projections.

This invention relates to self-threading tape reels and more particularly to self-threading tape reels which allow easy removal of the tape after winding.

In the telegraph industry it has long been the practice to wind tapes onto separable tape reels so that after a winding operation the reel can be separated and the tape removed for storage or re-use without the necessity of rewinding the tape. Prior art self-threading tape reels of the type wherein the tapes wound upon the reels are engaged by and are wound tightly onto the hub of the reels are not adaptable to this practice because all of the tape must be unwound from such reels before the tape can be disengaged from the hub.

Accordingly, an object of this invention is to provide a self-threading tape reel from which the tape can be removed without rewinding.

Another object of this invention is to provide a separable self-threaded tape reel.

In the preferred embodiment of the invention these and other objects are achieved by providing a separable tape reel having a plurality of triangularly shaped, toothed projections mounted on one of its flanges and a pair of invidually spring loaded fingers for driving the tape into engagement with the reel. During the initial engagement of the tape with the reel the fingers cause the tape to engage the reel on an angle so that the teeth of the projections engage holes in the tape and thereby cause the tape to be wound onto the reel. As the tape winds onto the reel the tension of the tape causes the tape to assume a cylindrical configuration around the outermost portions of the projections. This disengages the teeth from the tape so that the tape is readily removable from the reel whenever the reel is separated.

A more complete understanding of the invention may be had by referring to the following detailed description when taken in conjunction with the drawings wherein.

Figures 1, 2, 3, 4:
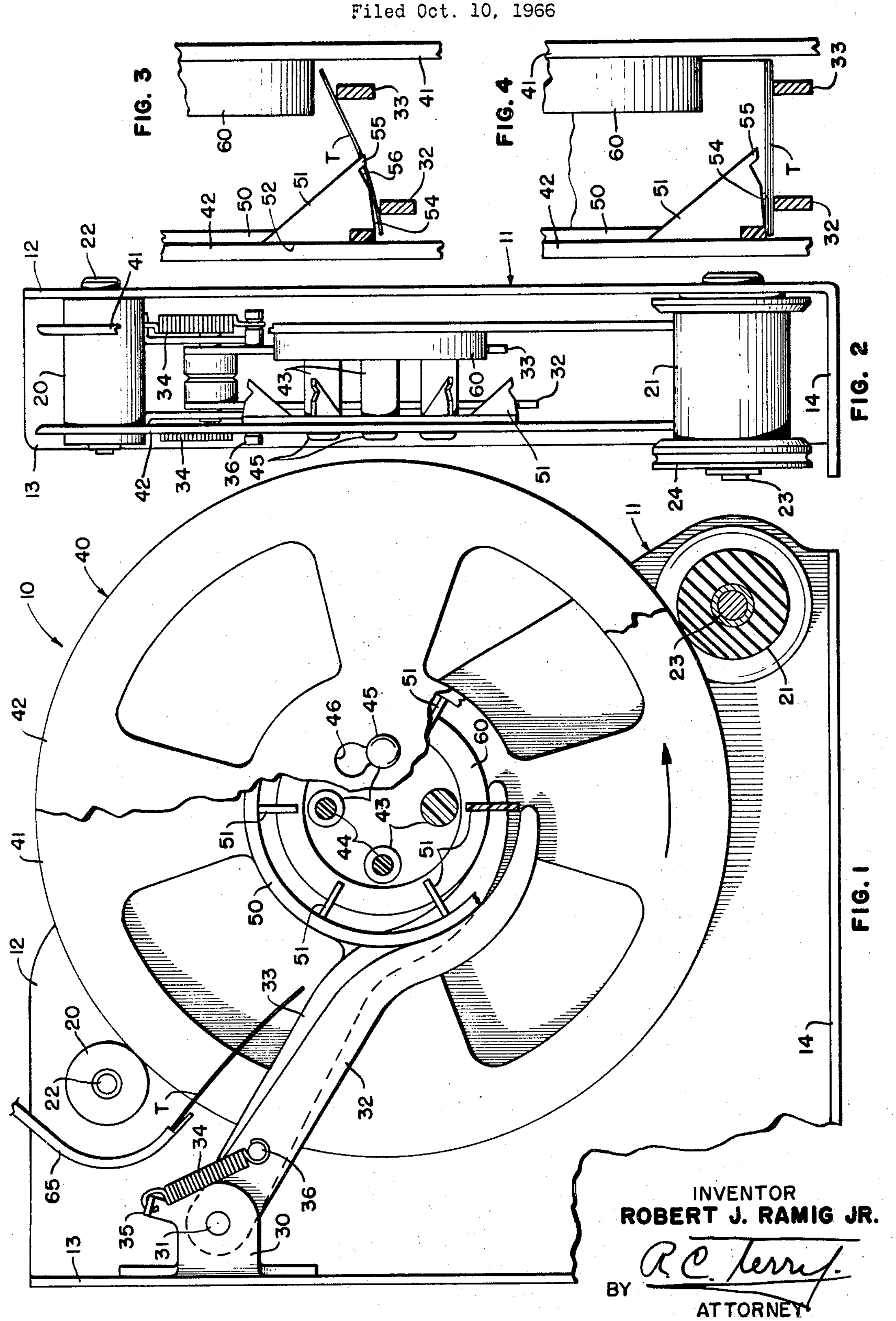
FIG. 1 is a side view of a self-threading tape reel mechanism employing the present invention in which certain parts have been broken away more clearly to illustrate certain features of the invention.
FIG. 2 is an end view of the tape reel mechanism shown in FIG. 1 in which certain parts have been broken away more clearly to illustrate certain features of the invention.
FIG. 3 is an enlarged, partial sectional view of the projections of the tape reel mechanism shown in FIGS. 1 and 2 during the initial engagement of a length of tape with the tape reel mechanism.
FIG. 4 is a view similar to FIG. 3 showing the projections of the tape reel mechanism after several wraps of tape have been wound onto the mechanism.

Referring now to the drawing wherein like reference numerals designate like parts through the several views, with particular reference being had to FIGS. 1 and 2, there is shown a tape reel mechanism 10. All of the components of the tape reel mechanism 10 are supported on a frame assembly 11 which is comprised of a side plate 12, a back plate 13 which is welded or otherwise joined to the side plate 12, and a bottom plate 14 which is similarly joined to both the side plate 12 and the back plate 13.

Mounted on the side plate 12 of the frame assembly 11 are a pair of tape reel supporting rollers 20 and 21. The rollers 20 and 21 are rotatably supported on the side plate 12 by means of a pair of pivot studs 22 and 23, respectively. As is best shown in FIG. 2 the roller 21 has mounted on its end remote from the side plate 12 a pulley 24 which may be connected by means of a suitable belt (not shown) to a motor (not shown) so that the roller 21 may be rotated with respect to the frame 11.

Mounted on the back plate 13 of frame 11 is a bracket 30 to which there is pivotally attached by means of a pin 31 a pair of individually spring loaded fingers 32 and 33. The fingers 32 and 33 are urged to rock counterclockwise (FIG. 1) with respect to the bracket 30 by a pair of springs 34 which are connected between a pair of tabs 35 on the bracket 30 and a pair of pins 36 on the fingers 32 and 33.

Mounted on the rollers 20 and 21 and supported thereby for rotation with respect to the frame 11 is a tape reel 40 which is comprised of a pair of interconnected flanges 41 and 42. The tape reel 40 shown in the drawings is of the separable variety in that the flanges 41 and 42 are interconnected by four pins 43 which form the hub of the tape reel 40. The pins 43 are attached to the flange 41 and have at their end remote from the flange 41 reduced neck portions 44 and enlarged head portions 45. The flange 42 has apertures 46 formed in its so that the flange 42 may be joined through a bayonet-type connection to the flange 41. This is accomplished by placing the enlarged head portions 45 of the pins 43 through enlarged openings in the apertures 46 of the flange 42 and then rotating the flange 42 to bring reduced portions of the openings 46 into engagement with the neck portions 44 of the pins 43. It should be understood that any separable reel, regardless of how the reel portions are interconnected, may be employed in practicing the present invention.

Mounted on the flange 42 and postioned concentrically about the axis thereof is a ring 50 having a pluality of triangularly shaped, toothed projections 51 mounted on it. As is best shown in FIGS. 3 and 4 the toothed projections have a first side 52 which is attached to the ring 50 and to the flange 42; a second side 53 which extends at a steep angle with respect to the flange 42, and a third side, comprising a winding surface 54 and a tooth 55, which extends at an angle of slightly less than 90° with respect to the flange 42. The winding portion 54 and the tooth 55 are formed from a common surface on the third side of the triangularly shaped projections 51 by forming a notch 56 in the third side of the projections.

Mounted on the flange 41 concentrically about the axis of the flange is a collar 60. The collar 60, the teeth 55 of the projections 51 and the winding surface 54 of the projections 51 form three radial levels with respect to the axis of rotation of the reel 40. The individually spring loaded fingers 32 and 33 are positioned on the frame 11 to move toward and away from the axis of rotation of the reel 40 in line with the first and the third of these radial levels, that is, in line with the collar 60 and the winding surface 54 of the projections 51.

In operation a tape T is directed into the self-threading tape reel mechanism 10 by a tape guide 65 which extends from a remote tape preparation or utilization device (not shown). As the tape T leaves the tape guide 65 it falls by action of gravity onto the individually spring loaded fingers 32 and 33. Since the fingers 32 or 33 are positioned to engage the tape reel 40 at the first and third radial levels of the tape reel 40 with respect to the axis of rotation thereof, that is, to engage the collar 60 and the winding surfaces 54 of the projections 51, the tape T is caused to engage the projections 51 of the tape reel 40 on a slant that extends nonparallel with respect to the axis of the reel 40 during the initial contact of the tape T with the tape reel 40.

The device depicted in the drawing is primarily designed for use with the perforated paper tape commonly used to record information in the telegraph industry. Such tape has perforations extending in various combinations entirely across its width. Therefore, since during the initial engagement of the tape T with the tape reel 40 the tape T engages the projections 51 of the reel 40 at an angle, the teeth 44 of the projections 51 engage holes in the tape T and cause the tape T to be automatically engaged by the tape reel 40 and to be wound thereon. This action is best shown in FIG. 3.

As soon as the tape T is engaged by the teeth 55 of the tape reel 40 a tension is applied to the tape T by the reel 40 which is resisted by the guide 65 and by the tape preparation or utilization device (not shown) from which the tape extends. This tension is applied uniformly across the width of the tape T and accordingly causes the tape T to assume a cylindrical configuration with respect to the reel 40, that is, causes the tape T to wrap around the winding surface 54 of the projections 51 out of engagement with the teeth 55 of the projections 51. During this time the initial wrap of the tape T which was originally engaged by the teeth 55 is disengaged therefrom by the resiliency of the tape so that the tape T is engaged with the tape reel 40 by means of friction only. Thus, after a winding operation has been completed the tape reel 40 can be disassembled and the tape T removed therefrom without the necessity of unwinding any of the tape T from the tape reel.

It has been found that the projections 51 can be suitably constructed for use with the one-inch wide paper tape commonly used in the telegraph industry by inclining the third surface, that is, the surface comprised of the winding surface 54 and the teeth 55, at an angle of approximately 5° with respect to the axis of rotation of the reel 40 and by placing the notches 56 at a point which is approximately 80% of the total distance from the flange 42 to the end of the third side of the projections 51. If teeth so constructed are mounted on a ring 50 of approximately three-inch diameter the invention described hereinbefore can be used with any of the many existing separable tape reels commonly employed to wind tapes in the telegraph industry.

Although only one embodiment of the invention is shown in the drawing and described in the foregoing specification, it will be understood that the invention is not limited to the specific embodiment described, but is capable of modification and rearrangement and substitution of parts and elements without departing from the spirit of the invention.

What is claimed is:

1. A self-threading winding device including:
a winding reel having an axis;
a projection mounted on the reel and having a tooth positioned a predetermined distance from the axis of the reel and a winding surface positioned adjacent the tooth and further than the predetermined distance from the axis, and
means positioned adjacent the reel for driving a web into engagement with the reel initially on a nonparallel slant with respect to the axis of the reel and subsequently cylindrically about the axis of the reel so that the web is engaged by the tooth of the projection during its first wrap onto the reel and so that the web winds onto the winding surface of the projection out of engagement with the tooth during subsequent wraps.

2. The device according to claim 1 wherein the winding surface and the tooth of the projection are both formed from a common surface inclined at an angle of approximately 5° to the axis of the reel and wherein the tooth is separated from the winding surface by a notch in the common surface located more than half of the total length of the common surface from the high end of the common surface.

3. The device according to claim 1 wherein the reel has a hub concentric with the axis and a pair of spaced, parallel flanges extending radially from the hub and wherein the driving means is a pair of individually spring loaded fingers mounted for rocking movement about an axis parallel to the axis of the reel between the flanges toward and away from the hub.

4. A device for winding tapes including:
a frame;
a tape reel having an axis of rotation;
means mounted on the frame for supporting the reel and for rotating the reel with respect to the frame;
a tape engaging member mounted on the reel including a tooth positioned a predetermined distance from the axis of the reel and a winding surface positioned axially adjacent the tooth and farther than the predetermined distance from the axis of reel; and
urging means mounted on the frame for movement in a path perpendicular to the axis of the reel into and out of engagement with the reel for urging a tape into engagement with both the tooth and the winding surface of the tape engaging member during initial contact of the tape with the reel and for urging the tape into engagement with only the winding surface of the tape engaging member during subsequent winding of the tape onto the reel.

5. The winding device according to claim 4 wherein the tape engaging member and the reel present three radial levels to the urging means and wherein the urging means drives the tape toward the first and the third of the levels.

6. The winding device according to claim 4 wherein the urging means is a pair of independently spring loaded fingers mounted for movement about an axis parallel to the axis of the reel toward and away from the reel, one of the fingers positioned for movement into and out of engagement with the winding surface of the tape engaging member and the other of the fingers positioned for movement in a path adjacent the tooth of the tape engaging member and extending perpendicularly to the axis of the reel.

7. A self-threading tape reel including:
a tape reel having a hub and two radially extending flanges spaced from each other a distance approximately equal to the width of a tape to be wound onto the reel.
a plurality of toothed projections mounted on the reel between the flanges with teeth of the projections positioned closer to the hub than the portions of the projections adjacent the teeth;
means for supporting and for rotating the reel, and
means for causing a tape to engage the projections on a slant with respect to the hub during an initial contact of the tape with the reel so that the teeth of the projections engage the tape and cause the tape to be wound onto the reel and for causing the tape to engage the projections cylindrically with respect to the hub during subsequent rotations of the reel so that the tape winds onto the portions of the projections adjacent the teeth out of engagement with the teeth of the projections.

8. The self-threading tape reel according to claim 7 wherein the toothed projections are mounted on one of the flanges and extend therefrom into the space between the flanges a distance less than the total distance between the flanges and wherein the portions of the projections adjacent the teeth are the portions connected to the one of the flanges.

9. The self-threading tape reel according to claim 8 wherein the means for causing the tape to engage the projections is a pair of fingers mounted between the flanges for movement toward and away from the hub, one finger positioned to drive the tape into engagement with the portions of the projections connected to the one of the flanges and the other finger positioned to drive the tape into the space between the projections and the other of the flanges.

10. A device for attachment to tape reels to make the reels self-threading comprising:

a ring having an axis, and a plurality of projections mounted around the circumference of the ring and extending axially therefrom, each projection having a winding surface position a predetermined distance from the axis of the ring and each having a tooth positioned less than the predetermined distance from the axis of the ring.

11. The device according to claim 10 wherein the winding surface and the teeth of each projection are formed from a common surface of the projection which is inclined at an angle of approximately 5° with respect to the axis of the ring.

12. The device according to claim 11 wherein the tooth and the winding surface of each projection are separated from each other by a notch formed in the common surface of the projection at a point approximately 80% of the total distance from the ring to the end of the common surface.

13. A winding mechanism including:

a frame;

a pair of fingers mounted on the frame for pivotal movement with respect thereto about a common axis;

a winding reel mounted on the frame in the path of movement of the fingers;

means for urging the fingers individually into engagement with the reel, and means for directing an article to be wound between the fingers and the reel.

14. The winding mechanism according to claim 13 further including a pair of rollers mounted on the frame for engaging the periphery of the reel and thereby rotatably supporting the reel with respect to the frame.

15. The winding mechanism according to claim 13 further including a plurality of projections mounted on the reel for engaging articles directed between the fingers and the reels.

16. The winding mechanism according to claim 13 wherein the urging means is comprised of a pair of springs connected between the frame and the fingers.

References Cited

UNITED STATES PATENTS

| | | | |
|---|---|---|---|
| 1,346,356 | 7/1920 | Wenderhold. | |
| 2,904,273 | 9/1959 | Turner et al. | 242—66 |
| 3,254,856 | 6/1966 | Camras. | |
| 3,282,521 | 11/1966 | Schuller et al. | 242—55.12 |

OTHER REFERENCES

German printed application, Gasser 1, 183, 366, published Dec. 10, 1964.

GEORGE F. MAUTZ, *Primary Examiner.*